United States Patent [19]
Kuroda et al.

[11] Patent Number: 6,029,704
[45] Date of Patent: Feb. 29, 2000

[54] ELECTROMAGNETIC CONTROL VALVE

[75] Inventors: Koji Kuroda, Ichinomiya; Isao Hattori, Gifu; Hiroshi Numata, Kariya; Yoshitsugu Kida, Suzuka, all of Japan

[73] Assignee: Denso Corporation, Japan

[21] Appl. No.: 09/241,292

[22] Filed: Feb. 1, 1999

[30] Foreign Application Priority Data

Feb. 6, 1998 [JP] Japan .................................. 10-025844
Jul. 13, 1998 [JP] Japan .................................. 10-197152

[51] Int. Cl.[7] ............................ F15B 13/044; F16K 31/06
[52] U.S. Cl. ................. 137/625.65; 251/129.15; 335/260
[58] Field of Search ................ 137/625.65; 251/129.15; 335/260

[56] References Cited

U.S. PATENT DOCUMENTS

| | | | |
|---|---|---|---|
| 4,809,749 | 3/1989 | Ichihashi | 137/625.65 |
| 5,118,077 | 6/1992 | Miller et al. | 251/129.15 |
| 5,788,213 | 8/1998 | Kanda et al. | 251/129.15 |

FOREIGN PATENT DOCUMENTS

| | | | |
|---|---|---|---|
| 64-87983 | 4/1989 | Japan | 137/625.65 |
| 1-242844 | 9/1989 | Japan | 137/625.65 |
| 7-151257 | 6/1995 | Japan . | |

*Primary Examiner*—Gerald A. Michalsky
*Attorney, Agent, or Firm*—Nixon & Vanderhye PC

[57] ABSTRACT

An electromagnetic control valve is composed of a spool section for switching fluid passages on or off, a solenoid section for driving the spool in one direction, a magnetic moving core slidably disposed in the stator, a nonmagnetic shaft fixed to the moving core, and a spring member for biasing the spool in the direction opposite to the one direction. The spool section includes a spool and a sleeve. The solenoid section is connected to the spool section and includes a cylindrical magnetic stator, cylindrical magnetic yoke disposed to surround the stator and a magnetic coil disposed between the stator and the yoke. The stator is fixed to the sleeve at one end and having a bottom at the other end thereof. The shaft has one end to be in contact with the end of the sleeve thereby positioning the moving core in a longitudinal direction in the stator.

14 Claims, 5 Drawing Sheets

6,029,704

ELECTROMAGNETIC CONTROL VALVE

CROSS REFERENCE TO RELATED APPLICATION

The present application is based on and claims priority from Japanese Patent Applications Hei 10-25844 filed on Feb. 6, 1998 and Hei 10-197152 filed on Jul. 13, 1998, the contents of which are incorporated herein by reference.

BACKGROUND OF THE INVENTION

1. Field of the Invention

The present invention relates to an electromagnetic valve for controlling fluid.

2. Description of the Related Art

JP-A-7-151257 shows an electromagnetic control valve which is composed of a yoke, a stator, a solenoid, a spool, a moving core, a nonmagnetic shaft fitted to the center hole of the moving core and a spring. The yoke and the stator are disposed opposite to each other at an air gap to surround the solenoid. Sealing members are disposed between the solenoid, which is covered by resinous member, and the yoke, and between the solenoid and the stator. Thus, although fluid comes into the inside of the yoke and the stator through the air gap between the yoke and the stator, fluid may not leak out from the valve. The shaft is supported by a pair of ball bearings at opposite ends thereof so that the shaft can move smooth in the axial direction. A pair of nonmagnetic rings is disposed between the core and each of the bearings. When the moving core is driven to move left or right, the nonmagnetic rings prevent the moving core from being in contact with one of the bearings. Thus, the moving core can be driven without influence of remanent magnetism of the core and the bearings. However, the above sealing structure and rings necessitate additional production cost and steps.

SUMMARY OF THE INVENTION

An object of the invention is to provide an improved electromagnetic control valve that does not necessitate additional production cost and steps for oil sealing and smooth operation of the valve.

Another object of the invention is to provide an electromagnetic control valve which has a hermetic solenoid section with a simple structure.

According to the main aspect of the invention, an electromagnetic control valve is composed of a spool section having a spool and a sleeve, a solenoid section having a unitary cylindrical magnetic stator and a magnetic coil disposed around the stator, a magnetic moving core slidably disposed inside the stator, a nonmagnetic shaft fixed to the moving core for positioning the moving core spaced apart in a longitudinal direction inside the stator. The stator has a flange fixed to the sleeve at one end, a cylindrical portion in which the moving core is slidably disposed and a bottom at the other end thereof. One end of the nonmagnetic shaft is contact with an end of the sleeve and the other end thereof comes into contact with the bottom when the solenoid is not energized. The flange portion can have a step portion on the outer periphery thereof fixed to an end of the yoke. The stator can also have a middle nonmagnetic portion. The moving core can have an air passage groove.

According to another aspect of the invention, an electromagnetic control valve is composed of a spool section for switching fuel passages on or off, a solenoid section for driving the spool in one direction, a magnetic moving core hermetically disposed in the solenoid section, a nonmagnetic shaft for fixed to the moving core, and a spring member for biasing the spool in the direction opposite to the one direction. The spool section including a spool and a sleeve, and the solenoid section including a cylindrical magnetic stator, cylindrical magnetic yoke disposed to surround the stator and a magnetic coil disposed between the stator and the yoke. The stator has a flange fixed to the sleeve at one end, a bottom at the other end thereof and a nonmagnetic portion at the middle thereof. The shaft has one end to be in contact with the end of the sleeve so that the moving core can be positioned accurately in the longitudinal direction in the stator.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

First Embodiment

Figure 1:
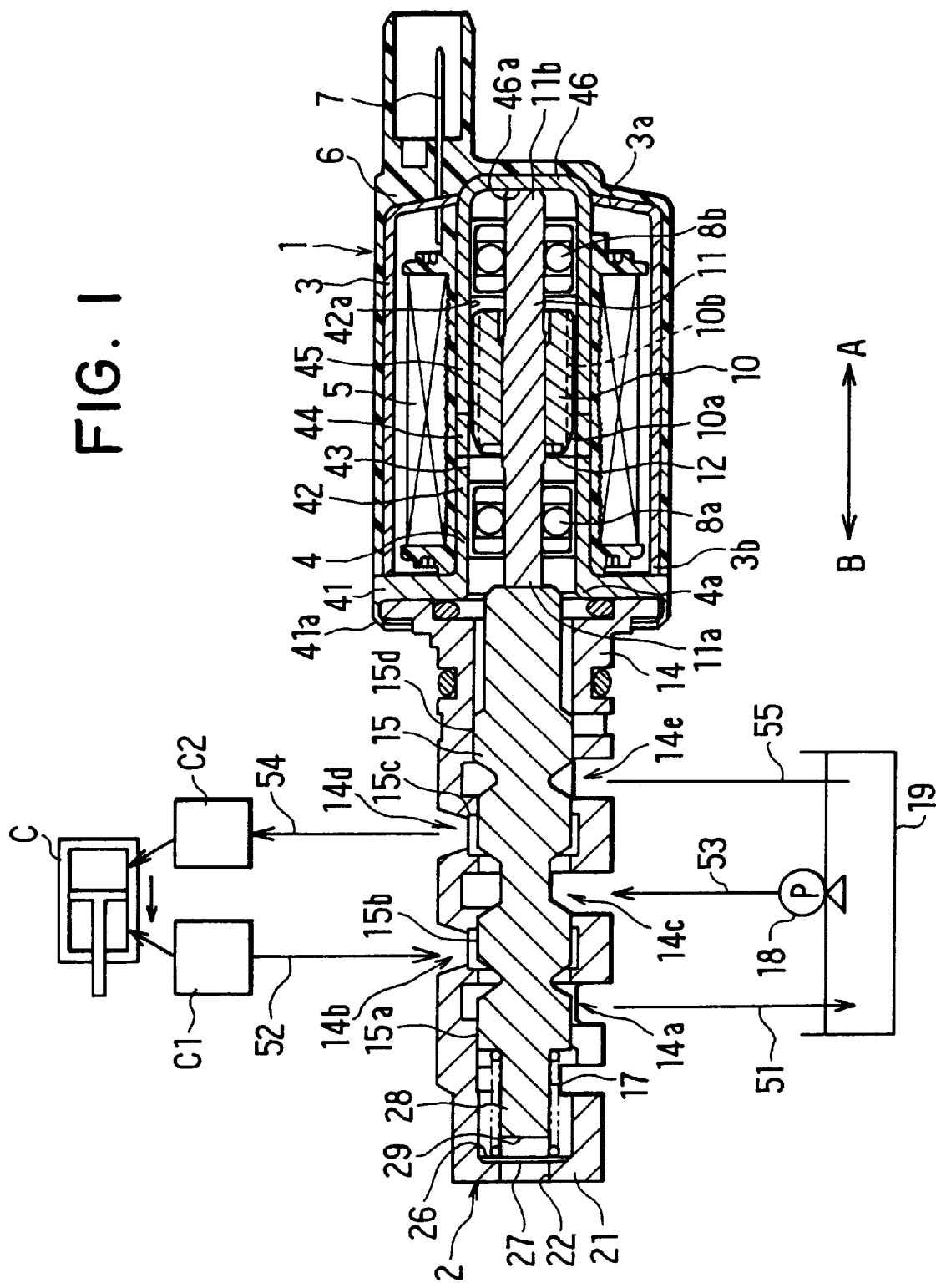
FIG. 1 is a cross-sectional side view of an electromagnetic control valve according to a first embodiment of the invention and a schematic diagram of the control system thereof when not energized.

An electromagnetic control valve according to a first embodiment of the invention is used as an oil control valve and described with reference to FIGS. 1–3.

Oil control valve is composed of solenoid section 1 and spool control valve section 2. Spool control section 2 is connected to control chambers C1, C2 and oil tank 19 through a plurality of oil passages 51, 52, 53, 54. Spool control section is driven by solenoid section 1 to control quantity of oil supplied to and discharged from control chambers C1, C2. Control chambers C1, C2 drive piston C of an oil pressure cylinder. Solenoid section 1 is composed of yoke 3, stator 4 and solenoid 5. Yoke 3 and stator 4 form a magnetic circuit for solenoid 5.

Figure 3:
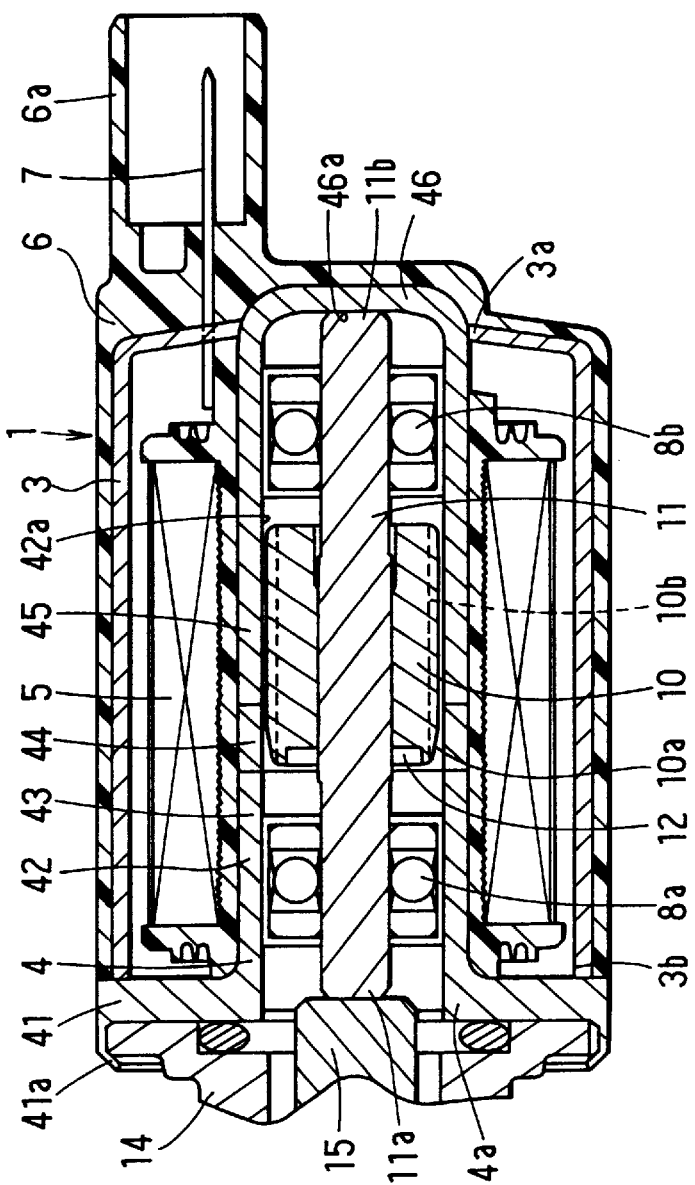
FIG. 3 is a fragmentary enlarged view of a main portion of the control valve illustrated in FIG. 1.

As shown in FIG. 3, stator 4 is a unitary cap-shaped cylindrical member that has flange 41 at open end 4a, cylindrical portion 42 and closed bottom 46 at the opposite end. Slide bore 42a is formed inside cylindrical portion 42. In other words, stator 4 is composed of magnetic flange portion 43 having flange 41, nonmagnetic middle cylindrical portion 44 and magnetic bottom portion 45 having closed bottom 46. Bottom portion also has inner bottom surface 46a. Spool section 2 has flange 14f clamped to stator 1 by bent member 41a extending from flange 41.

Figure 4:
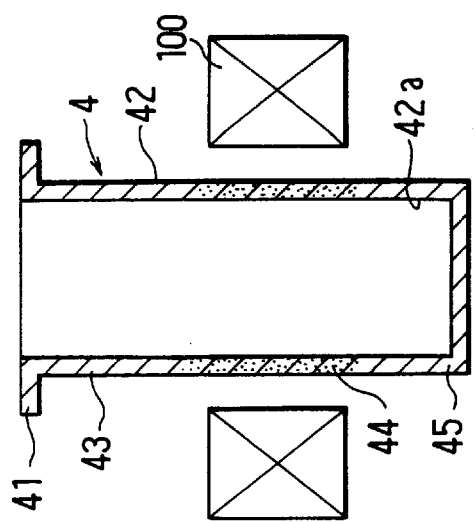
FIG. 4 is a schematic diagram showing a step of processing a stator of the control valve according to the first embodiment.

As shown in FIG. 4, stator 4 is press-formed or cold-forged from a nonmagnetic stainless steel plate into a cap-shaped cylinder, thereby providing ferromagnetism and slide bore 42a. Thereafter, the middle portion of the cap-shaped cylinder is heated by high-frequency heating coil 100 to be annealed. Thus, flange 41, flange portion 43 and bottom portion 45 provide ferromagnetism, and middle portion 44 provides nonmagnetism.

Yoke 3 has closing end 3a and open yoke end 3b. Closing end 3a is welded to stator 4 at a portion near bottom 46, and open end 3b is welded to stator 4 at a portion near flange 41.

Hollow cylindrical solenoid 5 is disposed on the outer periphery of stator 4 and surrounded by yoke 3. Yoke is covered by resinous casing 6 to hold solenoid section 1 tight. This suppresses vibration of solenoid section 1. Solenoid 5 is connected to terminal 7 extending in connector 6a. Connector 6a is molded integrally with casing 6 to protrude axially from a portion near bottom 46.

A pair of ball bearings 8a, 8b, the outer rings of which are made of magnetic material, is press-fitted to slide bore 42a. Left ball bearing 8a is disposed in flange portion 43 at a portion remote from the welded portion of yoke 3 to avoid problems caused by heat of welding of yoke 3 and stator 4. Right ball bearing 8b is disposed in bottom portion 45 at a portion remote from the other welded portion of yoke 3 and stator 4.

Moving core 10 is slidably disposed in slide bore 42a between ball bearings 8a and 8b. Moving core 10 has left end 10a that tapers off toward open end 4a of stator 4, a plurality of longitudinal passage grooves 10b, a center hole to which nonmagnetic shaft 11 is press-fitted, and concavity 12 formed at left end 10a. Shaft 11 has the same outside diameter except the press-fitted portion thereof and is slidably supported by the pair of bearings 8a, 8b, so that moving core 10 can move in the longitudinal direction. The plurality of passage grooves 10b permit air and oil to flow therethrough when moving core moves reciprocally. Concavity 12 limits magnetic passage between moving core 10 and ball bearing 8a when moving core 10 comes close to ball bearing 8a. This eliminates problems due to remanent magnetism and ensures precise control of oil pressure.

When solenoid 5 is not energized, the right end of shaft 11 is in contact with inner bottom surface 46a, so that moving core 10 stays at the middle of the space between bearings 8a, 8b, as shown in FIG. 1.

Spool section 2 is composed of sleeve 14 and spool 15. Sleeve 14 has a plurality of openings 14a, 14b, 14c, 14d, 14e respectively connected to various portions by a plurality of oil passages. Opening 14a is connected to oil tank 19 by drain passage 51, opening 14b is connected to control chamber C1 by oil passage 52, opening 14c is connected to oil pump 18 by supply passage 53, opening 14d is connected to control chamber C2 by oil passage 54, and opening 14e is connected to oil tank 19 by drain passage 55. Sleeve 14 also has flange 14f at the right end thereof clamped to flange 41 of housing 4 and spring case 21 at the left end thereof. Spring case 21 has an inside diameter smaller than the inside diameter of other portion of sleeve 14. Center hole 22 is formed in the left end of spring case 21. Ring-shaped spring seat 26 made of metal is disposed on the inner end surface of spring case 21. Spring seat 26 has center hole 27 which is smaller in diameter than center hole 22. Spool 15 has a plurality of lands 15a, 15b, 15c, 15d, grooves formed between the plurality of lands, and spring guide 28 on which compression coil spring 17 is fixed. The left end of spring guide 28 has a contact surface to be in contact with spring seat 26. The left end of spring 17 abuts on spring seat 26 and the right end thereof is fixed to the right base portion of guide member to bias spool 15 right or in direction A shown in FIG. 1.

When solenoid 5 is not energized, shaft 11 is biased by spring 17 so that right end surface 11b of shaft 11 comes into contact with inner bottom surface 46a and moving core stays at the middle of the space between bearings 8a, 8b, and the contact surface of spring guide 28 is separated from spring seat 26 as shown in FIG. 1. opening 14a is connected with opening 14b and disconnected from opening 14c, so that oil in control chamber C1 is discharged to oil tank 19, and opening 14d is connected to opening 14d and disconnected from opening 14e at this stage, so that oil is supplied by oil pump 18 to control chamber C2 from oil tank 19.

Figure 2:
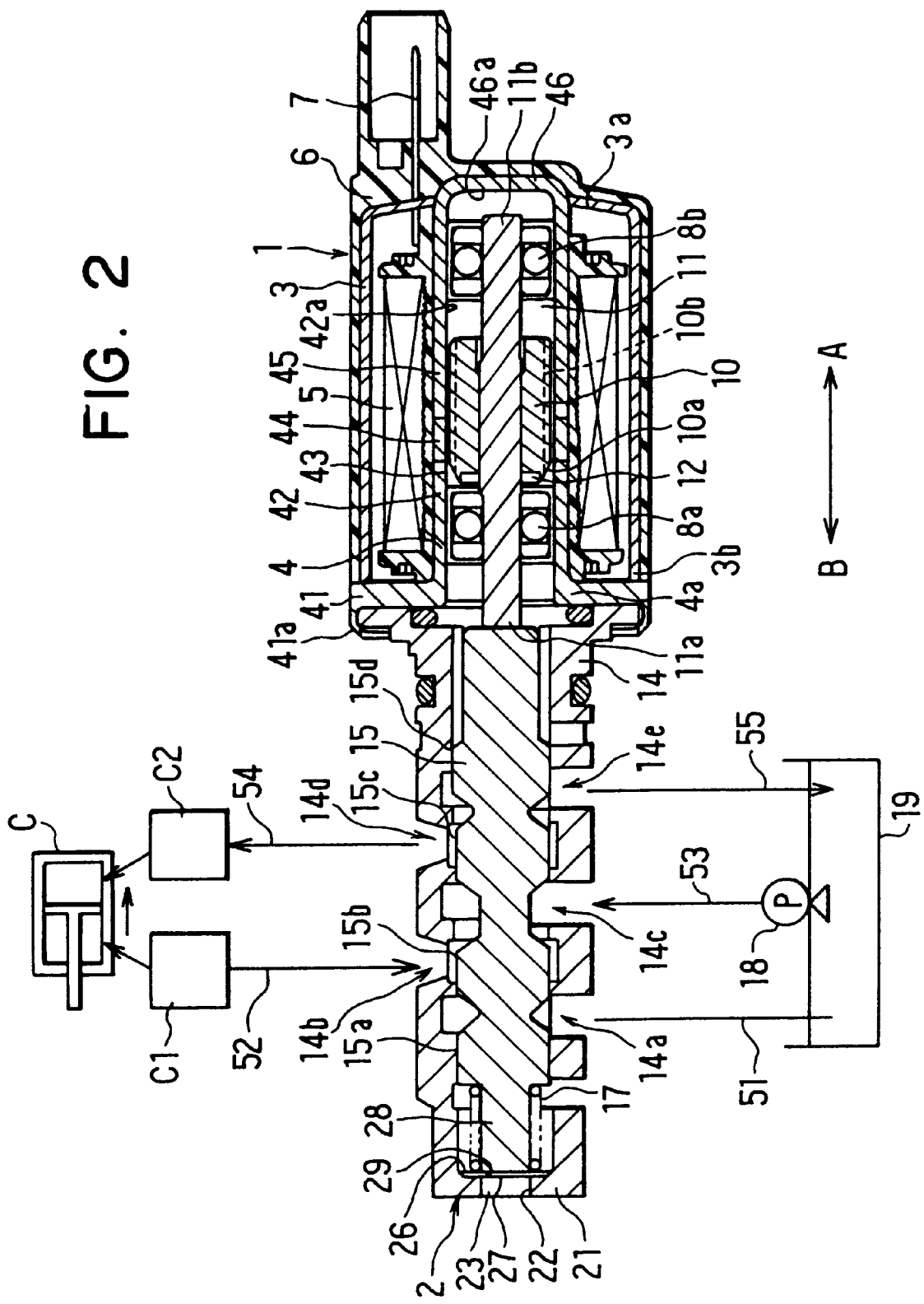
FIG. 2 is a cross-sectional side view of an electromagnetic control valve according to a first embodiment of the invention and a schematic diagram of the control system thereof when energized.

When solenoid 5 is energized, moving core 10 and shaft 11 move left to bring the left end of shaft 11 in contact with the right end of spool 14 to bring the contact surface of guide member 28 into contact with spring seat 26 against the biasing force of spring 17 as shown in FIG. 2. Consequently, shaft 11 provides a certain space between moving core 10 and bearing 8a. Thus, opening 14b is disconnected from opening 14a and connected to opening 14c to supply oil to control chamber C1 from oil tank 19, and opening 14d is disconnected from opening 14c and connected with opening 14e to discharge oil from control chamber C2 to oil tank 19.

When solenoid is deenergized thereafter, shaft 11 is moved right by spring 17 until right end surface 11b of shaft 11 comes into contact with inner bottom surface 46a of stator 4.

Because solenoid 5 is isolated by cap-shaped stator 4 from slide bore 42a completely, oil does not get into solenoid 5. Thus, oil is prevented from leaking out from solenoid 5 completely without any specific sealing member.

Second Embodiment

Figure 5:
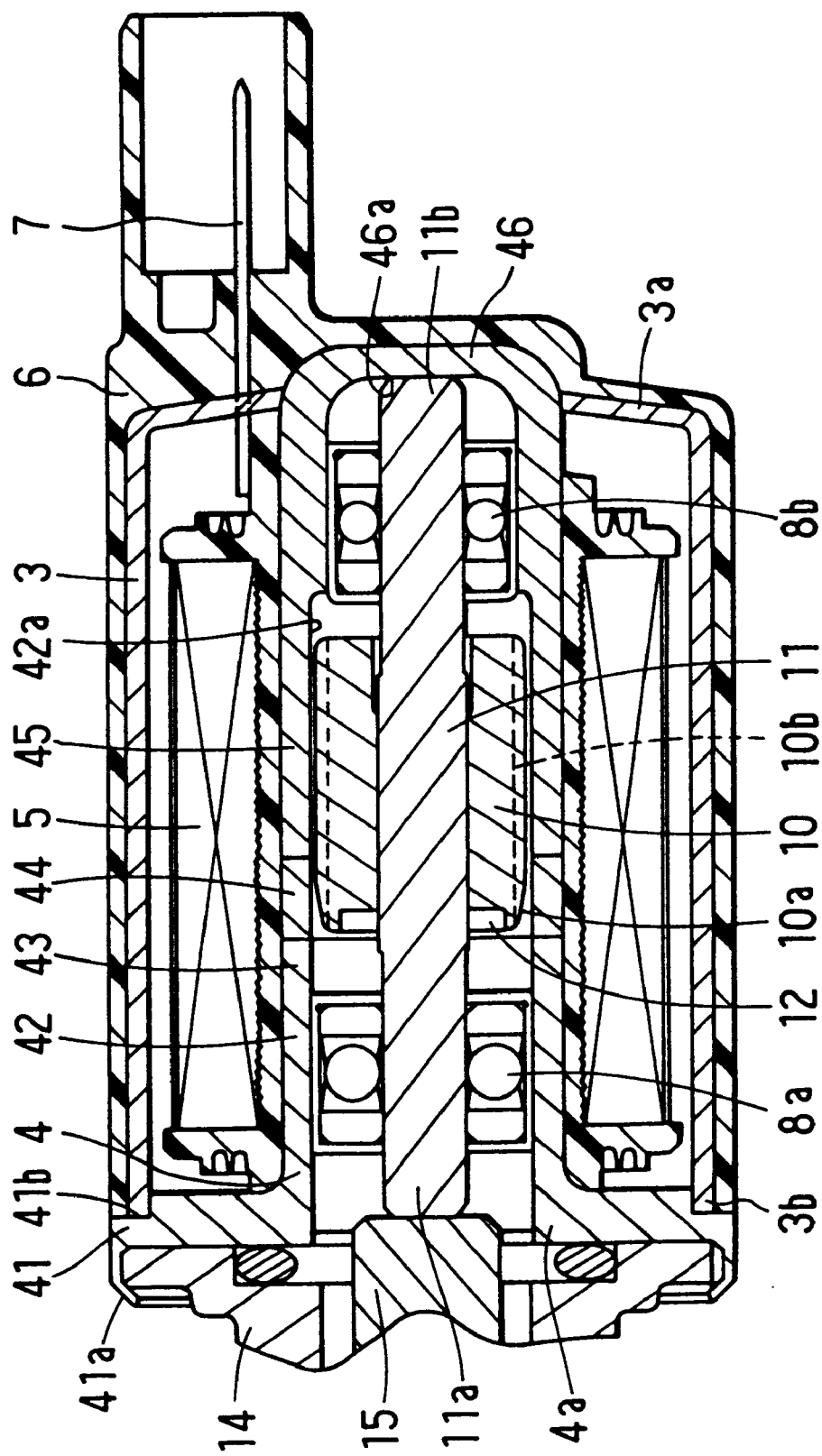
FIG. 5 is a fragmentary enlarged view of a main portion of a control valve according to a second embodiment of the invention.

A main portion of an electromagnetic control valve according to a second embodiment of the present invention is described with reference to FIG. 5.

Right bearing 8a has an outside diameter smaller than left bearing 8b so that slide bore 42a is prevented from being scratched when left bearing 8b is press-fitted to stator 4. Flange 41 has step portion 41b and yoke end 3b is fitted and welded thereto. Other portions are substantially the same as the first embodiment.

Third Embodiment

Figure 6:
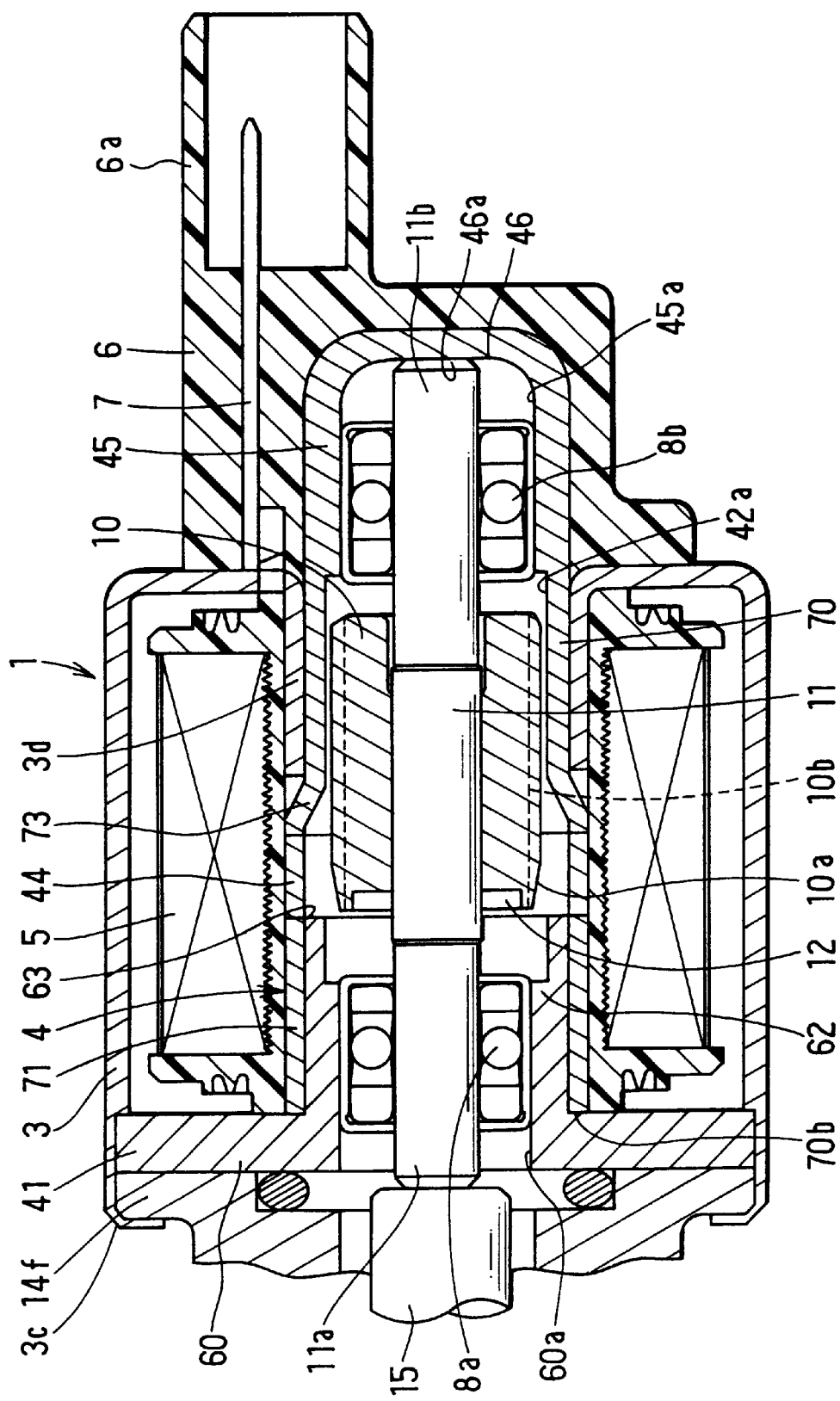
FIG. 6 is a fragmentary enlarged view of a main portion of a control valve according to a third embodiment of the invention.

A main portion of an electromagnetic control valve according to a third embodiment of the invention is described with reference to FIG. 6.

Stator 4 has flanged stator core 60 and unitary cap-shaped stator core 70 separately. Flanged stator core 60 has cylindrical portion 62 having inner periphery 60a to which the outer ring of ball bearing 8a is fitted, right end 63 and flange 41. Cap-shaped stator core 70 has connection portion 71 hermetically press-fitted to the outer periphery of cylindrical portion 62 of flanged core 60, middle section 44 and bottom portion 45. Liquid seal agent is put between the inner periphery of connection portion 71 and the outer periphery of cylindrical portion 62 to ensure sealing. Bottom portion 45 has bell-mouth-shaped open end 73 connected to middle section 44, slide bore 42a and inner periphery 45a. Slide bore 42a has an inside diameter smaller than inside diameter of middle section 44. Inner periphery 45a has an inside diameter smaller than slide bore 42a to which the outer ring of ball bearing 8b is press-fitted. Cylindrical core 70 is made of stainless steel and processed to provide ferromagnetism except middle section 44 in the same manner as described with reference to FIG. 4. Other portions, components and functions are substantially the same as the electromagnetic control valve according to the first or second embodiment.

Yoke 3 has bent portion 3c that clamps flange 41 of stator 4 and flange 14f of sleeve 14 together at the left end thereof and inner cylindrical portion 3d extending axially into the inside thereof to be press-fitted to the outer periphery of bottom portion 45 at the right end thereof. Since cylindrical portion 62 of flanged core 60 and inner cylindrical portion 3d of yoke 3 provide additional magnetic circuit for solenoid 5, moving core 10 can be driven easily with a comparatively small current supplied to solenoid 5.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An electromagnetic control valve comprising:
   a spool section for switching fluid passages on or off, said spool section including a spool and a sleeve;
   a solenoid section, connected to said spool section, for driving said spool in one direction, said solenoid section including a unitary magnetic stator made of a material that is changeable from magnetic to non-magnetic according to a processing thereof, a maonetic yoke disposed to surround said stator, and a magnetic coil disposed between said stator and said yoke, said stator having an open end fixed to said sleeve, a cylindrical portion, and a bottom end said cylindrical portion comprising a non-magnetic portion at a middle thereof where the material thereof has been processed so as to have been changed from magnetic to non-masnetic;
   a magnetic moving core slidably disposed in said cylindrical portion of said stator;
   a shaft fixed to said moving core; and
   a spring member for biasing said spool in a direction opposite to said one direction.

2. The electromagnetic control valve as claimed in claim 1, wherein said shaft is non-magnetic and has one end in contact with said spool and comes into contact with said bottom end when said solenoid is not energized, thereby positioning said moving core spaced apart in a longitudinal direction in said cylindrical portion of said stator.

3. The electromagnetic control valve as claimed in claim 1, wherein
   said stator has a flange at said open end.

4. The electromagnetic control valve as claimed in claim 3, wherein said flange has a step portion on an outer periphery thereof fixed to an end of said yoke.

5. The electromagnetic control valve as claimed in claim 1, wherein
   said moving core has an air passage groove.

6. An electromagnetic control valve to be connected to a fluid passage comprising:
   a spool section for switching said fluid passage on or off, said spool section including a spool and a sleeve;
   a solenoid section, connected to said spool section, for driving said spool in one direction, said solenoid section including a unitary magnetic stator made of a material that is changeable from magnetic to non-magnetic according to a processing thereof, a magnetic yoke disposed to surround said stator, and a magnetic coil disposed between said stator and said yoke, said stator having a flange fixed to said sleeve at one end, a cylindrical portion and a bottom at the other end thereof, said cylindrical portion having a non-magnetic portion at a middle thereof where the material thereof has been processed to chance from magnetic to non-magnetic;
   a magnetic moving core slidably disposed in said cylindrical portion of said stator;
   a non-magnetic shaft fixed to said moving core, said shaft having one end to be in contact with said one end of said sleeve and the other end to be in contact with said bottom when said solenoid is energized, thereby positioning said moving core spaced apart in a longitudinal direction in said stator; and
   a spring member for biasing said spool in a direction opposite to said one direction.

7. The electromagnetic control valve as claimed in claim 6, wherein
   said yoke comprises an inner cylindrical portion press-fitted to said stator.

8. The electromagnetic control valve as claimed in claim 6, wherein
   said stator is made of stainless steel processed to have magnetic portions and said nonmagnetic portion.

9. The electromagnetic control valve as claimed in claim 6, wherein
   said moving core has a passage groove connecting both ends thereof.

10. An electromagnetic control valve, comprising:
    a spool section for selectively enabling and disabling flow through fluid passages, said spool section including a spool slidably disposed in a sleeve;
    a solenoid section operatively coupled to said spool section for selectively driving said spool in a first axial direction, said solenoid section including a unitary stator, a magnetic yoke disposed in surrounding relation to said stator, and a magnetic coil disposed between said stator and said yoke, said stator having a first, open end adjacent said spool section, an intermediate cylindrical portion, and a second, bottom end, said stator being formed into a generally cylindrical shape to provide ferromagnetism and a slide bore, said stator being made of a material that is changeable from magnetic to non-magnetic according to a processing thereof, said intermediate portion of said stator comprising a non-magnetic portion where the material thereof has been processed so as to have been changed from magnetic to non-magnetic;
    a magnetic moving core slidably disposed in said slide bore of said stator;
    a shaft fixed to said moving core; and
    a spring member for biasing said spool in a direction axially opposite said one axial direction.

11. The electromagnetic control valve as claimed in claim 10, wherein
    said shaft is non-magnetic and has one end in contact with said spool and comes into contact with said bottom end when said solenoid is not energized, thereby positioning said moving bore spaced apart in a longitudinal direction in said cylindrical portion of said stator.

12. The electromagnetic control valve as claimed in claim 10, wherein said stator has a flange at said first, open end.

13. The electromagnetic control valve as claimed in claim 12, wherein said flange has a step portion on an outer periphery thereof fixed to an end of said yoke.

14. The electromagnetic control valve as claimed in claim 10, wherein said moving core has an air passage groove.

* * * * *